June 16, 1964 D. O. NISHINA 3,137,333
PORTABLE ELECTRIC VEGETABLE CUTTER
Filed April 29, 1963
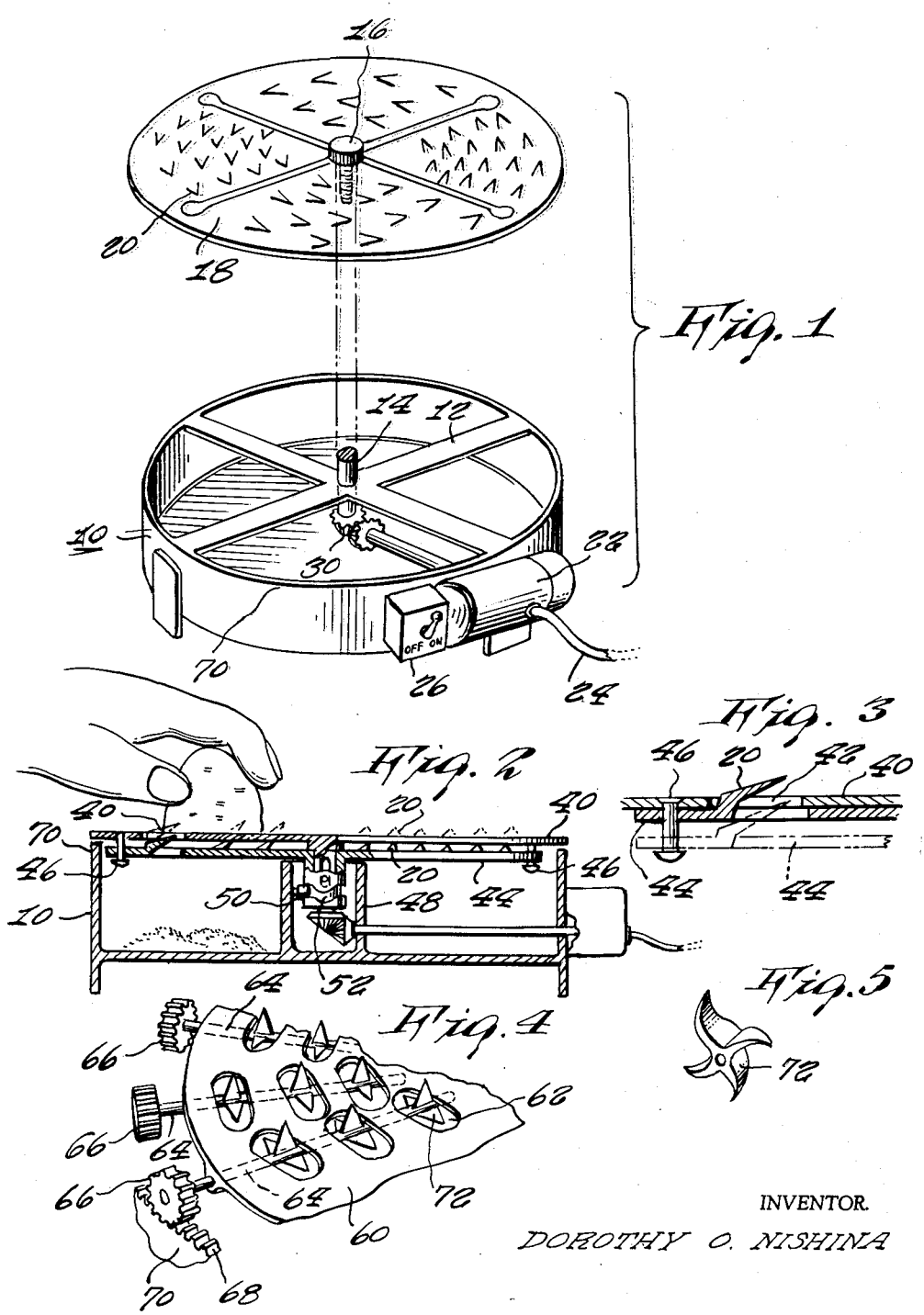
INVENTOR.
DOROTHY O. NISHINA

United States Patent Office 3,137,333
Patented June 16, 1964

1

3,137,333
PORTABLE ELECTRIC VEGETABLE CUTTER
Dorothy O. Nishina, P.O. Box 56, Holualoa, Hawaii
Filed Apr. 29, 1963, Ser. No. 276,387
2 Claims. (Cl. 146—177)

My invention is directed toward portable, electrically operated cutters for shredding, cutting and peeling vegetables.

It is an object of my invention to provide a new and improved cutter of the character indicated which can be used in schools, hotels, restaurants, or bakeries as well as in the home.

Another object of my invention is to provide a new and improved cutter of the character indicated which has cutting elements which rotate in several directions simultaneously.

Still another object of my invention is to provide a new and improved cutter of the character indicated which can be manufactured easily and inexpensively.

All of the foregoing as well as additional objects and advantages of my invention will now be explained with reference both to this specification and to the drawings wherein:

FIGURE 1 is an exploded view of my invention;

FIGURE 2 is a side cross sectional view of a modification of my invention;

FIGURE 3 is a detail of FIGURE 2 shown in an alternative position;

FIGURE 4 is a fragmentary view of another modification of my invention; and

FIGURE 5 is a detail of FIGURE 4.

Referring now to FIGURE 1, a vertical hollow bin 10 open at its top end and closed at its bottom end carries a horizontally extending support member 12 having the shape of an X. A vertical rotatable shaft 14 aligned with the axis of the bin extends upwards through the center of member 12. The top end of shaft 14 engages a bolt 16; the bolt 16 secures a rotatable disc 18 to the top end of shaft 14; the center of disc 18 being coincident with shaft 14. Disc 18 has a plurality of cutting elements 20 which shred food when the food is held in contact with these elements and disc 18 is rotated.

An electric motor 22 is mounted on the outside of the side of the bin 20 and is connected by an electric cord 24 to a source of power, motor 22 being turned on or off by the operation of switch 26. A horizontally extending motor shaft 28, rotated when the motor operates, engages the bottom end of shaft 14 by gears 30 to rotate disc 18.

FIGURES 2 and 3 show a modification wherein disc 18 is replaced by a first horizontal disc 40 having holes 42 through which cutting elements 20 extend. Elements 20 are secured to the top surface of a second parallel disc 44 positioned below disc 40. These discs are secured together by bolts 46 which permit disc 44 to be moved up

2 and down with respect to disc 40. Shaft 14 is mounted in a vertical sleeve 48 in bin 10. A cam follower 50 secured to the inner wall of sleeve 48 engages a cam 52 mounted on shaft 14. Cam 52 moves up and down by virtue of the action of follower 50 as shaft 14 rotates. Cam 52 slides on shaft 14 but is rigidly secured to disc 44 whereby disc 44 is moved up and down as it rotates and elements 20 therefore move up and down in holes 42 to provide a composite cutting and shredding action.

FIGURES 4 and 5 show a further modification of the device in FIGURE 1 wherein disc 18 is replaced by another disc 60 having holes 62 disposed along radial lines extending outward from the center of disc 60. A plurality of rotatable horizontal shafts 64 are aligned with these radial lines and extend outward to corresponding gears 66 rigidly affixed thereto. Each gear 66 engages a different portion of the toothed periphery 68 of the top circular edge 70 of the bin. Rotatable cutting elements 72 are secured to each shaft 64 and rotate therewith, each element projecting through a corresponding hole 62.

As shaft 14 rotates disc 60, shafts 64 also rotate, causing elements 72 to rotate horizontally thereabout while disc 60 rotates with shaft 14 whereby again a composite cutting and shredding action is obtained.

While I have described my invention with particular reference to the drawings, my protection is to be limited only by the terms of the claims which follow.

I claim as follows:

1. A cutter comprising a vertical hollow cylindrical bin open at the top end and closed at the bottom end, horizontally rotatable means positioned above the top of the bin and centrally aligned with the bin axis, said means carrying a plurality of cutting elements, and motor means secured to the side of said bin to rotate said horizontally rotatable means, further including means to move said elements in a vertical plane as said horizontal means rotate, wherein said horizontal means includes a disc having holes through which said elements extend, wherein said elements are rotated in said vertical plane.

2. A cutter as set forth in claim 1, wherein a plurality of radially extending horizontal rotatable shafts are secured to said disc, said elements being mounted on said radial shafts.

References Cited in the file of this patent

UNITED STATES PATENTS

| 569,250 | Steere | Oct. 13, 1896 |
| 2,856,976 | MacDougall | Oct. 21, 1958 |

FOREIGN PATENTS

| 58,189 | Germany | Aug. 13, 1891 |

OTHER REFERENCES

German printed application E9981, February 2, 1956.